(12) United States Patent
Szafraniec et al.

(10) Patent No.: US 8,121,480 B2
(45) Date of Patent: Feb. 21, 2012

(54) METHODS AND APPARATUS FOR RECOVERING FIRST AND SECOND TRANSMITTED OPTICAL WAVES FROM A POLARIZATION MULTIPLEXED OPTICAL WAVE

(75) Inventors: Bogdan Szafraniec, Sunnyvale, CA (US); Bernd Nebendahl, Leonberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 588 days.

(21) Appl. No.: 12/363,521

(22) Filed: Jan. 30, 2009

(65) Prior Publication Data

US 2010/0196008 A1    Aug. 5, 2010

(51) Int. Cl.
*H04J 14/06* (2006.01)
*H04B 10/06* (2006.01)

(52) U.S. Cl. .......................................... 398/65; 398/205
(58) Field of Classification Search .................. 398/65, 398/205–206
See application file for complete search history.

(56) References Cited

U.S. PATENT DOCUMENTS

| | | | |
|---|---|---|---|
| 2002/0191256 A1* | 12/2002 | Schemmann et al. | 359/161 |
| 2004/0016874 A1 | 1/2004 | LaGasse et al. | |
| 2004/0114208 A1 | 6/2004 | Balsamo et al. | |
| 2006/0228118 A1* | 10/2006 | Schemmann et al. | 398/184 |

OTHER PUBLICATIONS

Center for Imaging Science, IRAR: Direct Detection, IRAR: Coherent Detection, http://cis.jhu.edu/data.sets/mit_cis/laserradar/IRAR/detection.html, Jan. 7, 2009, 2 pages.
Wang, Tiecheng, et al., "A Novel Method of Polarization State Control for Polarization Division Multiplexing System", Chinese Optic Letters, vol. 6, No. 11, Nov. 10, 2008, pp. 812-814.
Steger, Carsten, "Best Fit Plane", http://mathforum.org/epigone/sci.math.num-analysis/querflonloo/369B15CC.468E#informa Munich University of Technology, Jan. 12, 1999.
Balanced Photodetector, Product Code: BPDV2xxxR, u2t photonics, www.u2t.com, Jan. 7, 2009, 5 pages.
Tsukamoto, Satoshi, et al., "Coherent Demodulation of 40-Gbit/s Polarization-Multiplexed QPSK Signals with 16-GHz Spacing After 200-km Transmission", Optical Society of America, 2005, 3 pages.
Tseytlin, M., et al., "Digital, Endless Polarization Control for Polarization Multiplexed Fiber-Optic Communication", Monday Afternoon, OFC 2003, vol. 1, pp. 103.

* cited by examiner

*Primary Examiner* — Dawayne Pinkney (57) ABSTRACT

First and second transmitted optical waves having orthogonal polarization states are combined in a polarization multiplexed optical wave. At an optical receiver, an electrical field of the polarization multiplexed optical wave is measured. A plurality of polarization states of the polarization multiplexed optical wave is determined from the measured electrical field. From the plurality of polarization states, a transform that aligns the orthogonal polarization states of the first and second transmitted optical waves with respect to principal axes of the optical receiver is estimated. The first and second transmitted optical waves are recovered by applying the transform to one of i) the polarization multiplexed optical wave and ii) the measured electrical field of the polarization multiplexed optical wave.

17 Claims, 8 Drawing Sheets

METHODS AND APPARATUS FOR RECOVERING FIRST AND SECOND TRANSMITTED OPTICAL WAVES FROM A POLARIZATION MULTIPLEXED OPTICAL WAVE

BACKGROUND

There are many ways to transmit data through an optical link of an optical transmission system. One simple way employs on-off keying, where an optical signal is simply turned "on" or "off" to define a binary data stream. Turning the optical signal "on" and "off" can be viewed as a simple form of amplitude modulation.

To improve the spectral efficiency of an optical transmission system, increasingly complex modulation formats may be used. Some of the more complex modulation formats may involve phase modulation or combined amplitude and phase modulation. One of the simplest forms of digital phase modulation is binary phase-shift keying (BPSK). A spectrally more efficient form of digital phase modulation is quadrature phase-shift keying (QPSK). In the QPSK modulation format, a signal's phase can take four discrete states. Both BPSK and QPSK belong to the same family of digital phase modulation formats, and are particular forms of n-ary phase shift keying. Another family of digital phase modulation formats combines amplitude shift keying (ASK) and phase shift keying (PSK). A subclass of these formats is sometimes denoted as quadrature amplitude modulation (QAM).

The spectral efficiency of an optical transmission system may be further improved by using two orthogonal polarization states for simultaneous transmission of two optical signals. This technique is known as polarization multiplexing. Polarization multiplexing doubles the efficiency of optical transmission.

In a typical polarization multiplexed optical transmission system, an optical transmitter uses a polarization beam combiner (PBC) to combine two optical waves having orthogonal polarization states. For example, the two optical waves could have horizontal and vertical polarization states. The output of the PBC is therefore an optical wave that carries the digital information of the two combined optical waves. The output optical wave is sometimes referred to as a "polarization multiplexed optical wave". Of note, the polarization state of the polarization multiplexed optical wave is not constant, but instead varies in response to phase and amplitude changes in either or both of the two combined optical waves.

A polarization multiplexed optical wave propagates through an optical link to an optical receiver. However, as a result of birefringence in optical fiber, and because of the dependence of birefringence on environmental factors such as temperature and vibration, the polarization states of the optical waves combined in a polarization multiplexed optical wave change as the waves propagate through an optical link. As a result, when the polarization multiplexed optical wave arrives at an optical receiver, the polarization states of the combined optical waves are different from what they were at the optical transmitter. For example, if the two combined optical waves were transmitted in horizontal and vertical polarization states, it is almost a certainty that their polarization states will not be horizontal and vertical when they arrive at an optical receiver (although their orthogonal relationship will be maintained in the absence of polarization dependent loss). Nonetheless, optical receivers are typically configured to separate a polarization multiplexed optical wave into optical waves having horizontal and vertical polarization states. As a result, the originally combined optical waves are not properly recovered, and a transform is needed to recover the originally combined optical waves. Once the transform is found, it can then be applied to the polarization multiplexed optical wave by means of a polarization controller that aligns the polarization states of the combined optical waves with respect to the principal axes of an optical receiver. Alternately, the transform can be applied to digital representations of the optical waves, as extracted from a polarization multiplexed optical wave by an optical receiver. For example, digital representations of extracted optical waves having horizontal and vertical polarization states may be mathematically transformed into digital representations of the originally combined optical waves.

As disclosed by Tsukamoto et al. in "Coherent Demodulation of 40-Gbit/s Polarization-Multiplexed QPSK Signals with 16-GHz Spacing after 200-km Transmission", *Optical Fiber Communication Conference and Exposition and the National Fiber Optic Engineers Conference*, Technical Digest (CD) (Optical Society of America, 2005), paper PDP29, and as disclosed by Tseytlin et al. in "Digital, Endless Polarization Control for Polarization Multiplexed Fiber-optic Communications", *Optical Fiber Communications Conference*, 2003, Vol. 1, p. 103 (Mar. 23-28, 2003), the way to find a transform for recovering originally combined optical waves is to undertake an 'iterative search' for the transform. Other disclosures in the art also discuss the need to undertake an 'iterative search'. However, iteratively searching for a transform can be slow and unreliable.

BRIEF DESCRIPTION OF THE DRAWINGS

Illustrative embodiments of the invention are illustrated in the drawings, in which.

DETAILED DESCRIPTION

Figure 1:
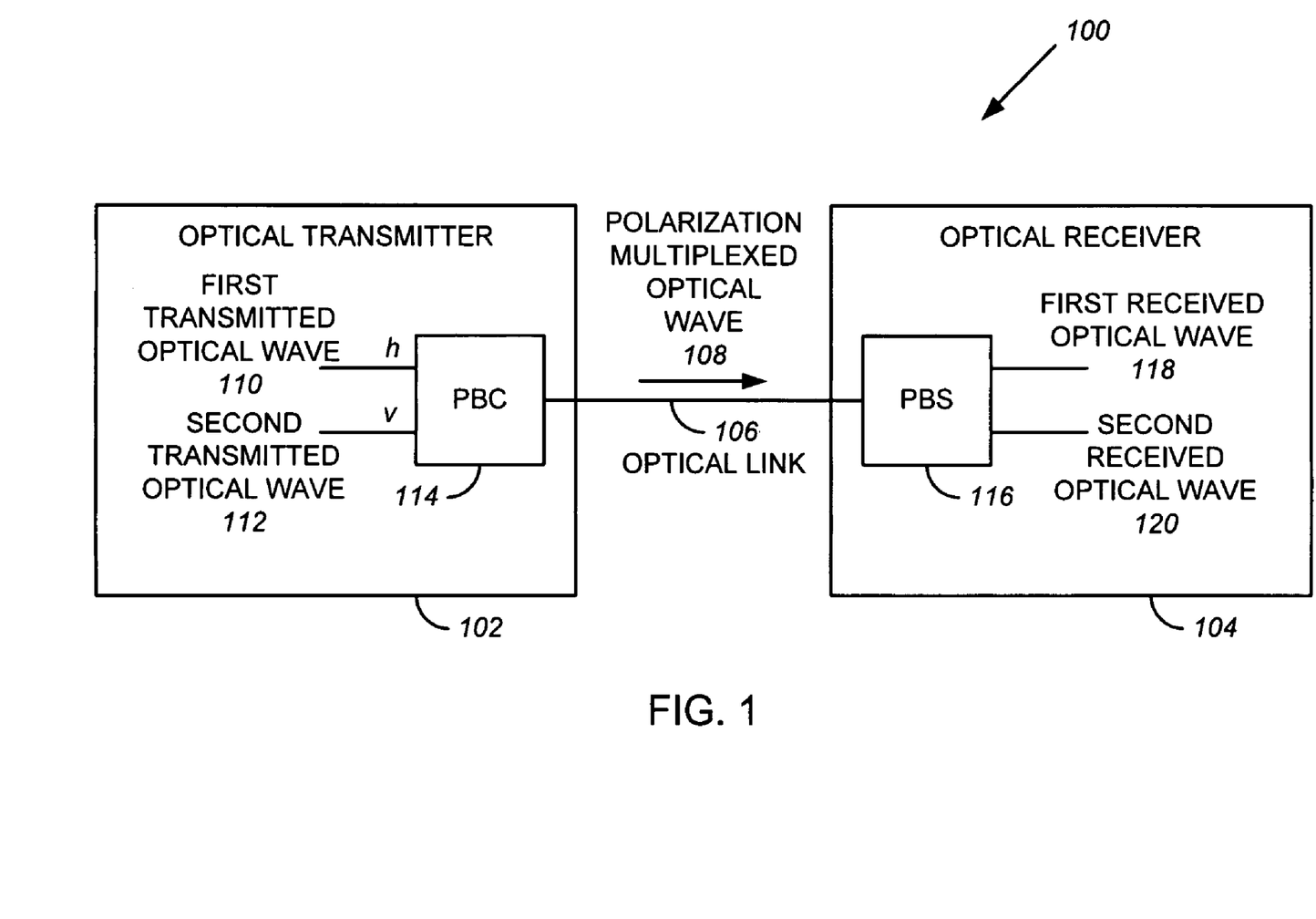
FIG. 1 illustrates an exemplary polarization multiplexed optical transmission system.

FIG. 1 illustrates an exemplary polarization multiplexed optical transmission system 100. In general, the system 100 comprises an optical transmitter 102 and an optical receiver 104, coupled to one another via an optical link 106.

The optical transmitter 102 transmits a polarization multiplexed optical wave 108 over the optical link 106. As is the case in polarization multiplexed optical systems, the optical transmitter 102 forms the polarization multiplexed optical wave 108 by combining first and second transmitted optical waves 110, 112 having orthogonal polarization states. The optical waves 110, 112 are combined using a polarization beam combiner (PBC) 114.

For purposes of this description, the first and second transmitted optical waves 110, 112 that are combined to form the polarization multiplexed optical wave 108 are respectively designated as: the horizontal wave, h, and the vertical wave, v. These designations are purely arbitrary and are made solely for the purpose of establishing a frame of reference within a polarization multiplexed optical transmission system 100.

Having respectively designated the first and second transmitted optical waves 110, 112 as the horizontal wave, h, and the vertical wave, v, the polarization multiplexed optical wave 108 may be described by the following Jones vector, E:

$$E = \begin{pmatrix} z_h \\ z_v \end{pmatrix} = \begin{pmatrix} a_h \exp(j\varphi_h) \\ a_v \exp(j\varphi_v) \end{pmatrix}, \quad (1)$$

where $a_h$ and $a_v$ are the respective amplitudes of the first and second transmitted optical waves 110, 112, and $\phi_h$ and $\phi_v$ are their respective phases. Both elements, $z_h$ and $z_v$, of the Jones vector, E, are complex. By factoring out $\sqrt{a_h^2 + a_v^2}\exp(j\phi_h)$, the Jones vector, E, may be rewritten as:

$$E = \sqrt{a_h^2 + a_v^2}\,\exp(j\varphi_h)\begin{pmatrix}\cos(\alpha) \\ \sin(\alpha)\exp(j\varphi)\end{pmatrix}, \quad (2)$$

where $a_h/\sqrt{a_h^2+a_v^2}=\cos(\alpha)$, $a_v/\sqrt{a_h^2+a_v^2}=\sin(\alpha)$, and $\phi=\phi_v-\phi_h$.

The normalized Jones vector $$\begin{pmatrix}\cos(\alpha) \\ \sin(\alpha)\exp(\varphi)\end{pmatrix} \text{ of } \quad \text{Eq. (2)}$$

describes the polarization state of the optical wave that results from combining the optical waves 110, 112. Polarization state can also be described by the Stokes vector. In this regard, the Jones vector of Eq. (1) can be converted to the Stokes vector, S, as follows:

$$S = \begin{pmatrix} s_0 \\ s_1 \\ s_2 \\ s_3 \end{pmatrix} = \begin{pmatrix} z_h z_h^* + z_v z_v^* \\ z_h z_h^* - z_v z_v^* \\ z_h^* z_v + z_h z_v^* \\ -j(z_h^* z_v - z_h z_v^*) \end{pmatrix} \quad (3)$$

The elements or parameters, $s_0$, $s_1$, $s_2$, $s_3$, of the Stokes vector, S, represent the power, content of 0° linear light, content of 45° linear light, and content of circular light in an optical wave. For the normalized Jones vector $$\begin{pmatrix}\cos(\alpha) \\ \sin(\alpha)\exp(\varphi)\end{pmatrix}, \quad \text{Eq. (3)}$$

can be rewritten in the following form:

$$S = \begin{pmatrix} s_0 \\ s_1 \\ s_2 \\ s_3 \end{pmatrix} = \begin{pmatrix} 1 \\ \cos(2\alpha) \\ \sin(2\alpha)\cos(\varphi) \\ \sin(2\alpha)\sin(\varphi) \end{pmatrix}. \quad (4)$$

When the power component of the Stokes vector is normalized to "1", as reflected in Eq. (4), the point $(s_1, s_2, s_3)$ describes a polarization state on the sphere known as the Poincaré sphere (to be described below).

Figure 2:
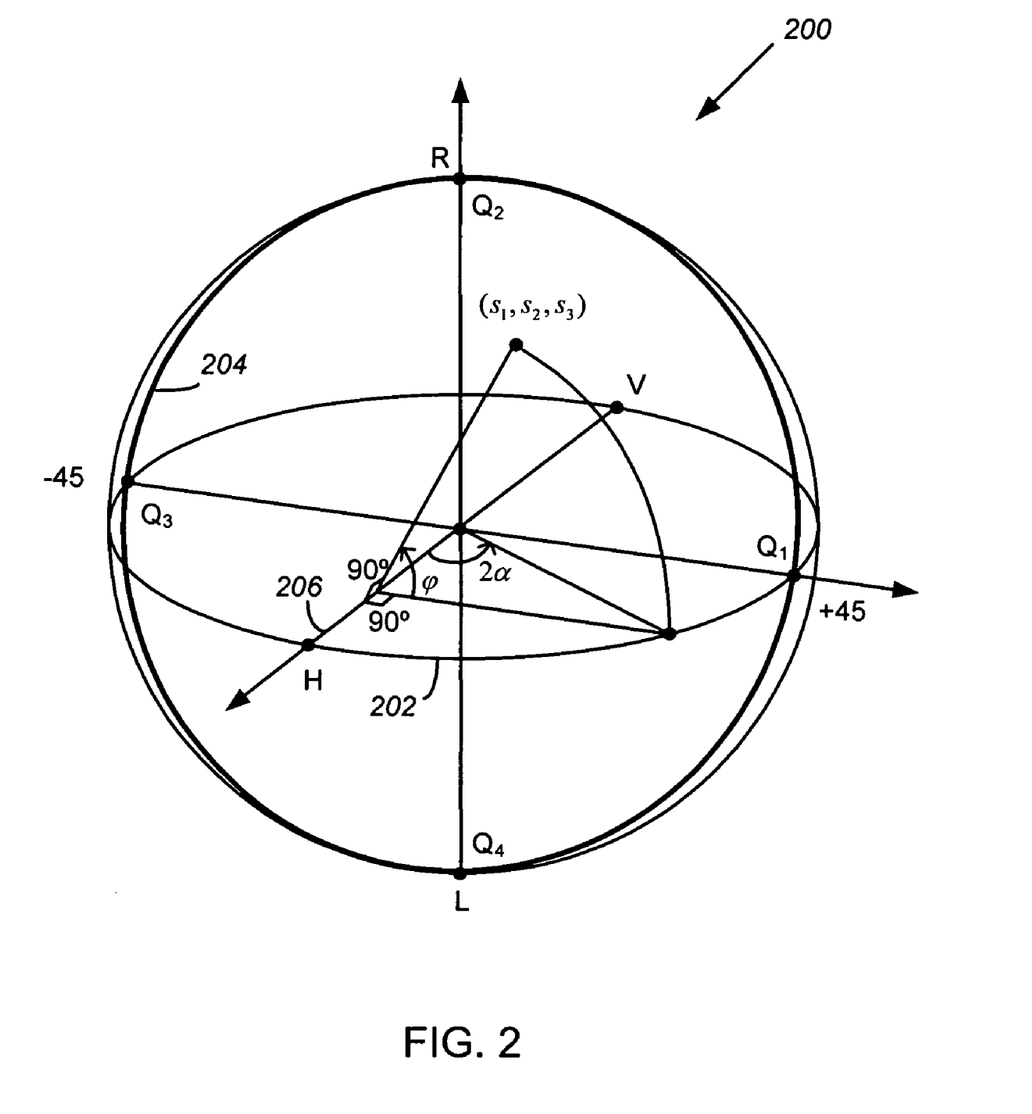
FIG. 2 illustrates, on a Poincaré sphere, a great circle of polarization states of a polarization multiplexed optical wave transmitted from an optical transmitter.

A representative Poincaré sphere 200 is shown in a three-dimensional space in FIG. 2. The three-dimensional space is a Cartesian space having three axes for plotting the normalized Stokes vector, or polarization state, of an optical wave. The first of the axes is the H/V axis. It describes the content of 0° linear light in an optical wave. The point "H" designates horizontally-polarized light, and the point "V" designates vertically-polarized light. Polarization states "H" and "V" are orthogonal and appear on opposite sides of the Poincaré sphere 200. The second of the axes is the +45/−45 axis. It describes the content of 45° linear light in an optical wave. The point "+45" designates +45° linearly polarized light, and the point "−45" designates −45° linearly polarized light. Polarization states +45° and −45° are orthogonal and appear on opposite sides of the Poincaré sphere 200. The third of the axes is the L/R axis. It describes the content of circular light in an optical wave. The point "L" designates left-circular polarized light, and the point "R" designates right-circular polarized light. Polarization states R and L are orthogonal and appear on opposite sides of the Poincaré sphere.

The point $(s_1, s_2, s_3)$, in FIG. 2, designates the Cartesian coordinates of a polarization state defined by Eq. (3). The point $(s_1, s_2, s_3)$ can alternately be described by the angles $\alpha$ and $\phi$. The angles $\alpha$ and $\phi$ define the Jones vector of Eq. (2). On the Poincaré sphere, the angle $2\alpha$ is an angle of rotation from the 0° linear polarization state "H", along an equator 202 defined by the plane containing the H/V and +45/−45 axes. The angle $\phi$ is an angle of rotation about the H/V axis, beginning from the polarization state defined by the angle $2\alpha$.

If the first and second transmitted optical waves 110, 112 are nearly equal in amplitude, and both are predominantly phase modulated, the Jones vector that describes a polarization state of the polarization multiplexed optical wave 108 (see Eq. (2)) takes the simpler form of:

$$E = \begin{pmatrix} 1 \\ \exp(j\varphi) \end{pmatrix}. \quad (5)$$

Based on Eq. (4), the parametric description of the trajectory traced on the Poincaré sphere 200 by the polarization state of the polarization multiplexed optical wave 108 described by the Jones vector of Eq. (5) is therefore: $(0, \cos(\phi), \sin(\phi))$. This description is applicable to the polarization multiplexed optical wave 108 at the optical transmitter 102, where the orthogonal polarization states of the first and second transmitted optical waves 110, 112, respectively, coincide with the points H and V shown in FIG. 2. Then, the trajectory of the polarization state of the polarization multiplexed optical wave 108 is a great circle 204 that contains the L and R poles of the Poincaré sphere 200, as well as a set of ±45° linear polarization states. The polarization states of the first and second transmitted optical waves 110, 112 are therefore identified by an axis 206 that is normal to the plane containing the great circle 204.

In the case of digital phase modulation, the polarization states that define the plane of the great circle 204 may take discrete values. For example, if the phase modulation is quadrature phase shift keying (QPSK), the phase difference, $\phi=\phi_v-\phi_h$, between the first and second transmitted optical waves 110, 112 defines four discrete polarization states (e.g., states $Q_1$-$Q_4$) belonging to the great circle 204. In the more general case, when the first and second transmitted optical waves 110, 112 are modulated by an n-ary phase shift keying, Eq. (4) describes n discrete polarization states that belong to the great circle 204.

Typically, the optical link 106 through which the polarization multiplexed optical wave 108 is transmitted will be an optical fiber (e.g., a fiber-optic cable), but in some cases, the optical link 106 could take other forms, including that of free space. Because of the birefringence of optical fiber, and because of the dependence of birefringence on environmental factors such as temperature and vibration, the polarization states taken by the polarization multiplexed optical wave 108 evolve with time and position as the polarization multiplexed optical wave 108 propagates through the optical link 106. However, the polarization states of the first and second transmitted optical waves 110, 112 remain orthogonal, or at least substantially so, i.e., on the Poincaré sphere 200, the polarization states of the first and second transmitted optical waves 110, 112 are always on opposite sides of the sphere. As a result of the polarization state evolution, the position of the great circle 204 that defines the polarization states of the polarization multiplexed optical wave 108 is typically in a different position when the polarization multiplexed optical wave 108 arrives at the optical receiver 104. For example, the great circle 204 might move to the position 300 shown in FIG. 3. Similarly, the axis 302 defining the orthogonal polarization states of the first and second transmitted optical waves, h and v, is in a new position. Yet, the relationships between 1) the great circle 204 and the axis 206 of FIG. 2, and 2) the great circle 300 and the axis 302 of FIG. 3 remain constant, or at least substantially so (i.e., the polarization states of the polarization multiplexed optical wave 108 are on or near a great circle, and the axis normal to the plane containing the great circle identifies the polarization states of the first and second transmitted optical waves 110, 112).

Figure 3:
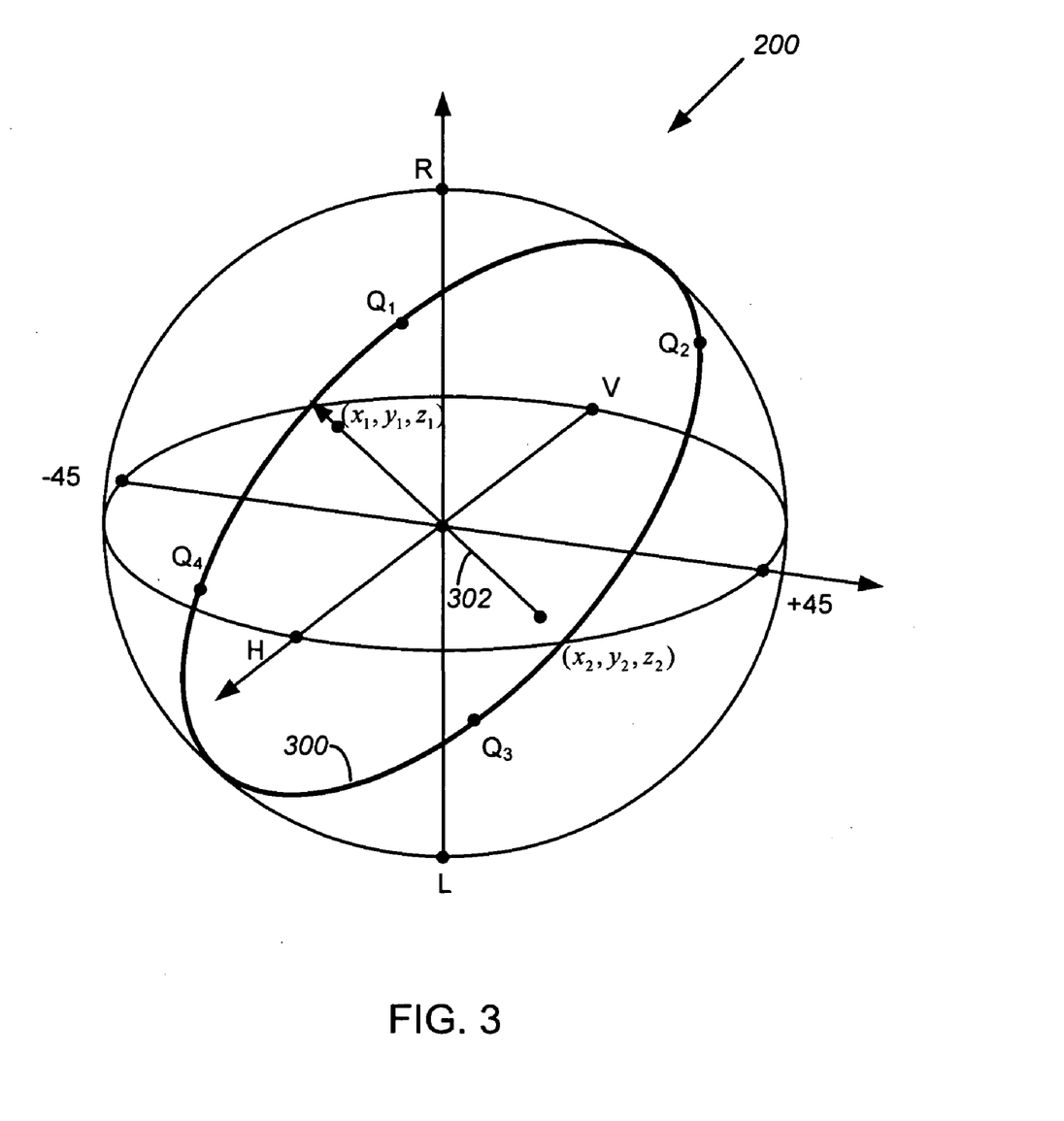
FIG. 3 illustrates, on a Poincaré sphere, a rotated great circle of polarization states, corresponding to the polarization states of the polarization multiplexed optical wave received at an optical receiver.

At the optical receiver 104, a polarization beam splitter (PBS) 116 splits the polarization multiplexed optical wave 108 into first and second received optical waves 118, 120 having orthogonal polarization states. If the principal axes of the optical receiver 104 (e.g., the principal axes of the PBS) are aligned with the polarization states of the first and second transmitted optical waves 110, 112, then the first and second received optical waves 118, 120 will be the first and second transmitted optical waves 110, 112. However, because of the birefringence of fiber, and because of the dependence of birefringence on the environmental factors described above, such an alignment rarely exists, and the polarization states of the first and second transmitted optical waves 110, 112 are typically rotated with respect to the principal axes of the PBS 116. This is shown in FIG. 3, where the principal axes of the PBS 116 are assumed to be aligned with the H/V axis of the Poincaré sphere 200, and where the orthogonal polarization states of the first and second transmitted optical waves are designated by the points $(x_1, y_1, z_1)$ and $(x_2, y_2, z_2)$. The points $(x_1, y_1, z_1)$ and $(x_2, y_2, z_2)$ lie on the axis 302 of the Poincaré sphere 200. As a result, to recover the first and second transmitted optical waves 110, 112, a transform is needed to align the orthogonal polarization states $(x_1, y_1, z_1)$ and $(x_2, y_2, z_2)$ of the first and second transmitted optical waves 110, 112 with the principal axes H and V of the receiver 104.

Figure 4:
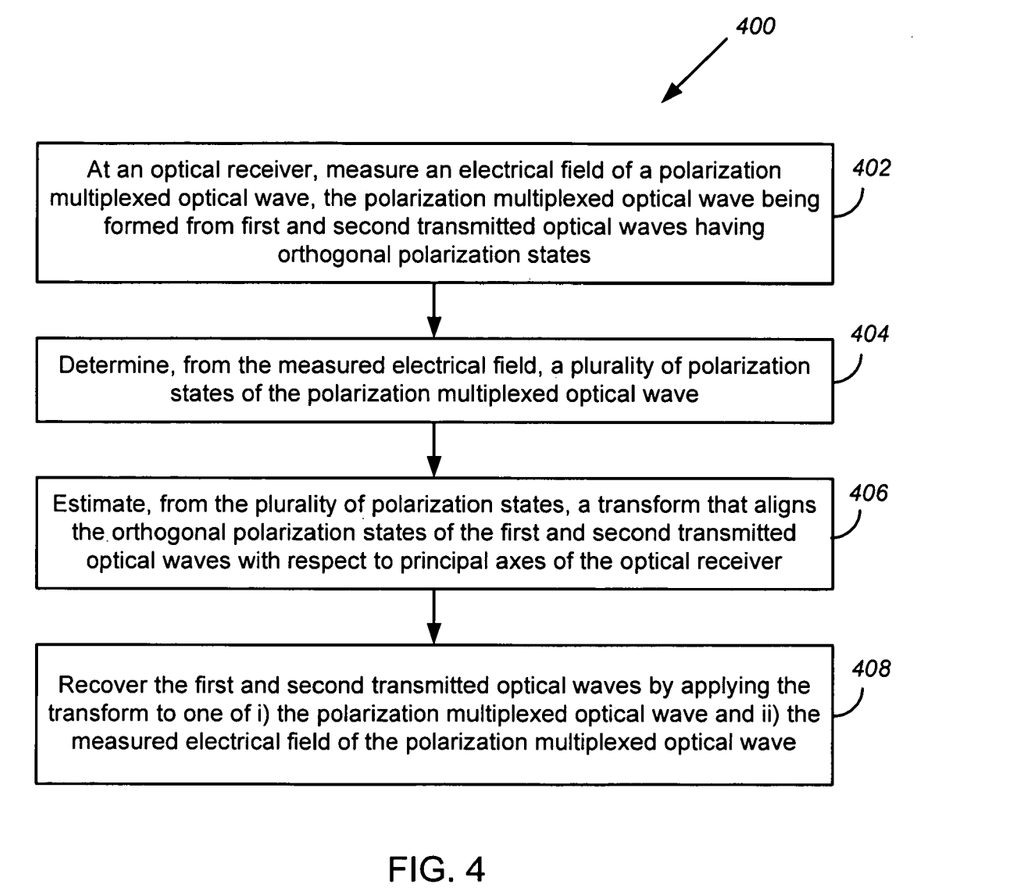
FIG. 4 illustrates a method of recovering first and second transmitted optical waves from a polarization multiplexed optical wave.

In light of the need to recover the first and second optical waves at the optical receiver 104, FIG. 4 illustrates an exemplary method 400 for recovering first and second transmitted optical waves 110, 112 from a polarization multiplexed optical wave 108 (where the first and second transmitted optical waves have orthogonal polarization states). The method 400 comprises measuring an electrical field of the polarization multiplexed optical wave 108 at an optical receiver 104 (at block 402). From the measured electrical field, a plurality of polarization states of the polarization multiplexed optical wave 108 is determined (at block 404). From the plurality of polarization states, a transform that aligns the orthogonal polarization states of the first and second transmitted optical waves 110, 112 with respect to the principal axes of the optical receiver 104 is estimated (at block 406). The first and second transmitted optical waves 110, 112 are then recovered by applying the transform to one of i) the polarization multiplexed optical wave 108 and ii) the measured electrical field of the polarization multiplexed optical wave 108.

By way of example, the transform may be applied to the polarization multiplexed optical wave 108 by altering the polarization state of the polarization multiplexed optical wave 108. Alternately, measuring the electrical field of the polarization multiplexed optical wave 108 may comprise determining a Jones vector that describes the polarization multiplexed optical wave 108. The transform may then be applied to the measured electrical field of the polarization multiplexed optical wave 108 by applying the transform to the Jones vector.

Exemplary ways to implement various aspects of the method 400 will now be described.

Figure 5:
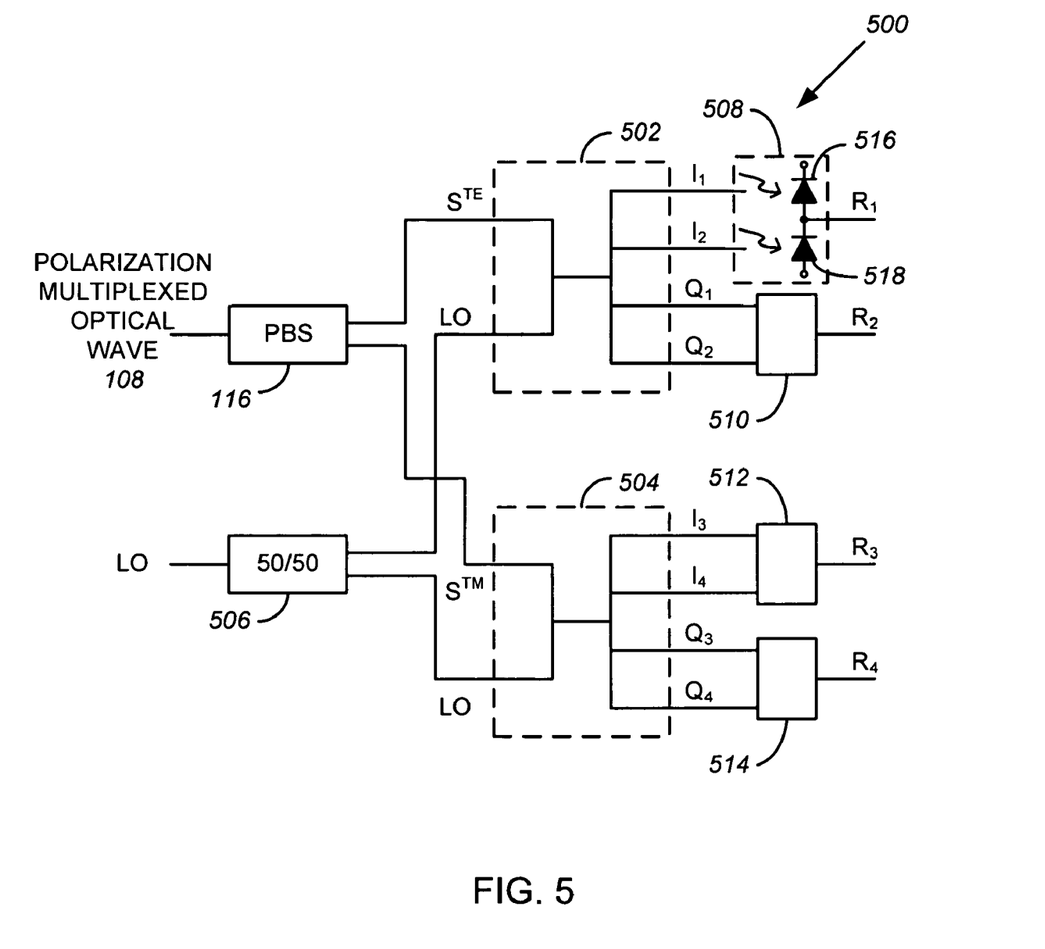
FIG. 5 illustrates an exemplary optical receiver.

FIG. 5 illustrates an exemplary optical receiver 500 for measuring various parameters of the optical field of the polarization multiplexed optical wave 108. By way of example, the optical receiver 500 is a polarization diverse heterodyne receiver using a pair of 90° optical hybrids.

The optical receiver 500 comprises a PBS 116 that receives a polarization multiplexed optical wave 108 comprised of first and second transmitted optical waves 110, 112 having orthogonal polarization states. The PBS 116 splits the polarization multiplexed optical wave 108 into first and second received optical waves, $S^{TE}$ and $S^{TM}$, having orthogonal polarization states, where TE stands for Transverse Electric and TM stands for Transverse Magnetic. This notation is frequently used in connection with planar lightwave circuits to denote a component of the electromagnetic wave that is orthogonal to the plane of the optical structure. In a Cartesian system of coordinates, the z axis can be used to denote the direction of propagation, while the x and y axes are parallel and perpendicular to the planar structure. The linear polarization mode (state) aligned with the x-axis is called TE, and the linear polarization mode (state) aligned with the y-axis is called TM. Because of rotation of the polarization states of the first and second transmitted optical waves 110, 112 with respect to the principal axes of the PBS 116, the first and second received optical waves 118, 120 will likely not be the same as the first and second transmitted optical waves 110, 112. Typically, the first and second received optical waves, $S^{TE}$ and $S^{TM}$, are linear combinations of the first and second transmitted optical waves 110, 112. Therefore, the first and second received optical waves contain the information needed to recover the first and second transmitted optical waves 110, 112.

After being split from the polarization multiplexed optical wave 108 by the PBS 116, the first received optical wave, $S^{TE}$, is provided to an input of a first 90° optical hybrid 502, and the second received optical wave, $S^{TM}$, is provided to an input of a second 90° optical hybrid 504. The optical receiver 500 also receives (or generates) a local oscillator signal, labeled LO in FIG. 5. The local oscillator signal is provided to each of the first and second 90° optical hybrids 502, 504 in a polarization state that is aligned with TE or TM optical waves. In some embodiments, the local oscillator signal may be provided to the 90° optical hybrids 502, 504 via a 50/50 splitter 506.

Each of the 90° optical hybrids 502, 504 further divides the signal ($S^{TE}$ or $S^{TM}$) into two optical waves whose phases differ by $\pi/2$. Similarly, the LO signal which is provided to the optical hybrids 502, 504 is also further divided into two optical waves whose phases differ by $\pi/2$. The resulting four optical waves can be combined in the four different ways shown below. This process leads to the creation of optical signals that, after detection, result in electrical in-phase (I) and quadrature (Q) signals. It will be shown below that having quadrature signals I and Q allows for reconstruction of the amplitude and phase of the received optical waves $S^{TE}$ or $S^{TM}$. The operation of the 90° optical hybrids 502, 504 is known to those skilled in the field of optical communications. The optical signals that are created within the 90° optical hybrid 502 are:

$$I_1 = S^{TE} + LO$$

$$I_2 = S^{TE} - LO$$

$$Q_1 = S^{TE} + jLO$$

$$Q_2 = S^{TE} - jLO \quad (6)$$

The optical signals that are created within the 90° optical hybrid 504 are:

$$I_3 = S^{TM} + LO$$

$$I_4 = S^{TM} - LO$$

$$Q_3 = S^{TM} + jLO$$

$$Q_4 = S^{TM} - jLO \quad (7)$$

The above optical waves are used to illuminate four balanced detectors 508, 510, 512, 514. In some embodiments, each of the balanced detectors 508, 510, 512, 514 may comprise a pair of photodiodes (e.g., the photodiodes 516, 518 of detector 508), which photodiodes are connected in series between first and second biasing voltages. Each of the photodiodes is illuminated by a respective optical wave and thereby produces an electrical current that is proportional to the optical intensity of the optical wave. Thus, the optical signals $I_i$ produce an electric current that is proportional to $|I_i|^2$. Similarly, the optical signals $Q_i$ produce an electrical current that is proportional to $|Q_i|^2$. Within the four balanced detectors, the produced currents are subtracted in pairs to produce the four electrical signals shown below:

$$R_1 = |I_1|^2 - |I_2|^2 = |S^{TE} + LO|^2 - |S^{TE} - LO|^2 = 4|S^{TE}||LO|\cos(\phi_{S^{TE}} - \phi_{LO})$$

$$R_2 = |Q_1|^2 - |Q_2|^2 = |S^{TE} + jLO|^2 - |S^{TE} - jLO|^2 = 4|S^{TE}||LO|\sin(\phi_{S^{TE}} - \phi_{LO})$$

$$R_3 = |I_3|^2 - |I_4|^2 = |S^{TM} + LO|^2 - |S^{TM} - LO|^2 = 4|S^{TM}||LO|\cos(\phi_{S^{TM}} - \phi_{LO})$$

$$R_4 = |Q_3|^2 - |Q_4|^2 = |S^{TM} + jLO|^2 - |S^{TM} - jLO|^2 = 4|S^{TM}||LO|\sin(\phi_{S^{TM}} - \phi_{LO}) \quad (8)$$

The electrical signals $R_1$, $R_2$, $R_3$ and $R_4$ can be further amplified. For simplicity, the responsivity of the photodiodes and any further amplification is omitted from this description. Typically, after digitization, the electrical signals $R_1$, $R_2$, $R_3$ and $R_4$ are combined into complex quantities as shown below:

$$z_x = R_1 + jR_2 = 4|S^{TE}||LO|\exp(j(\phi_{S^{TE}} - \phi_{LO}))$$

$$z_y = R_3 + jR_4 = 4|S^{TM}||LO|\exp(j(\phi_{S^{TM}} - \phi_{LO})) \quad (9)$$

Thus, assuming that the power of the local oscillator signal, LO, is known, the polarization diversity receiver 500 allows for reconstruction of the electrical field of an optical wave at its input, with a precision of an unknown LO phase shift $\phi_{LO}$. Since the unknown phase shift can be removed in the demodulation process, it is correct to rewrite the above equations in a simplified form without loss of generality. Therefore, $$z_x \propto a_x \exp(j\phi_x)$$

$$z_y \propto a_y \exp(j\phi_y) \quad (10)$$

Based on Eqs. (1)-(3), the measured Jones vector $$\begin{pmatrix} z_x \\ z_y \end{pmatrix}$$

represents the electrical field of the polarization multiplexed optical wave 108 at the optical receiver 104 (with a precision of an unknown LO phase shift $\phi_{LO}$). Furthermore, the measured Jones vector $$\begin{pmatrix} z_x \\ z_y \end{pmatrix}$$

uniquely defines the polarization state of the polarization multiplexed optical wave 108. Therefore, the polarization diversity receiver 500 can be used as a polarimeter. In particular, the polarization diverse optical receiver 500 can be used as a polarimeter that determines the position of the rotated great circle 300 in FIG. 3 with respect to the principal axes of the optical receiver 500.

Furthermore, based on the position of the great circle 300 in FIG. 3, a transform that aligns the orthogonal polarization states of the first and second transmitted optical waves 110, 112 with respect to the principle axes of the PBS 116 may be estimated. As discussed previously, this may be done by: fitting a plane in Stokes space to the plurality of measured polarization states; identifying a normal to the plane, the normal containing the center of the Poincaré sphere 200; and then determining a transform that aligns the normal with respect to the principal axes of the optical receiver 500 (which axes are defined by the axes of the PBS 116).

Figure 6:
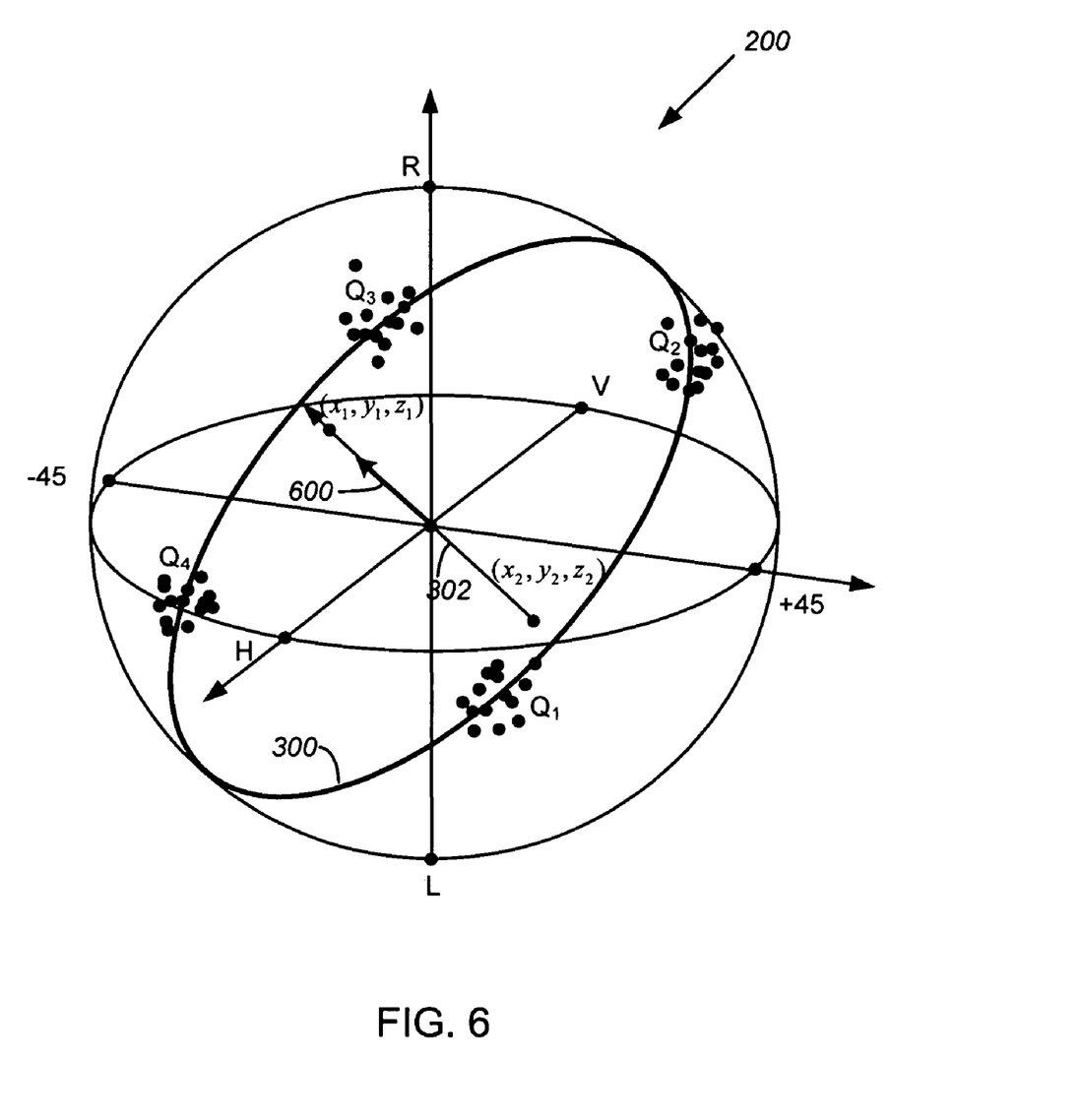
FIG. 6 illustrates, on a Poincaré sphere, clusters of measured polarization states for a polarization multiplexed optical wave composed of QPSK-modulated first and second transmitted optical waves.

FIG. 6 illustrates an exemplary fit of a plane to a plurality of measured polarization states. As shown, the plane intersects the Poincaré sphere 200 to define a circle of polarization states. The circle may in some cases be a great circle 300, but it need not be. Because a plurality of measured polarization states may exhibit some scatter, the plane may not intersect each and every one of the measured polarization states. The scatter exhibited by the polarization states may result from various factors, such as limited bandwidth of the transmitter 102 and receiver 104 (FIG. 1), electrical and optical noise sources, or environmental factors such as temperature and vibration. It is therefore desirable to fit the plane to a large number of polarization states (e.g., tens to thousands of polarization states), thereby minimizing the effects of scatter on the precision of the fit. It is possible, however, to fit a plane to only three polarization states. It is also possible to fit a plane to only two polarization states and the center of the Poincaré sphere 200. However, such "small sample size" plane fittings can lead to undesirable loss of precision.

Ideally, the polarization states of a particular sample set should not belong to the same cluster. That is, the polarization states should be distributed equally amongst a plurality of locations or regions of a circle, such as the great circle 300. For example, FIG. 6 illustrates a distribution of polarization states amongst four "clusters", with each cluster representing polarization states $Q_1$-$Q_4$, as might be expected in a system where the first and second transmitted optical waves 110, 112 of a polarization multiplexed optical wave 108 have been phase modulated in accord with QPSK.

Under ideal conditions, the plane that is fit to the plurality of polarization states intersects the center of the Poincaré sphere 200 and defines a great circle on the Poincaré sphere 200. However, even if the plane does not contain the center of the sphere 200, and does not define a great circle, the normal 600 (FIG. 6) to the plane is chosen to contain the center of the sphere 200. Therefore, the normal 600 intersects the sphere 200 in two points located on opposite sides of the sphere 200, i.e., in orthogonal polarization states. The axis 302 intersects the sphere 200 at two points, $(x_1, y_1, z_1)$ and $(x_2, y_2, z_2)$, which points correspond to the rotated polarization states of the first and second transmitted optical waves 110, 112. Because each of the points $(x_1, y_1, z_1)$ and $(x_2, y_2, z_2)$ describes a Stokes vector that is normal to the plane (or great circle 300) of the measured polarization states, either of the points may be used to estimate a transform that aligns the orthogonal polarization states of the first and second transmitted optical waves 110, 112 with respect to the principal axes of the receiver 500, as defined by the PBS 116. For the purpose of the below description, the point $(x_1, y_1, z_1)$ is used to define the normal 600 to the plane of the great circle 300. The point $(x_2, y_2, z_2)$ defines a polarization state that is orthogonal to the polarization state defined by point $(x_1, y_1, z_1)$, therefore, $(x_2, y_2, z_2) = (-x_1, -y_1, -z_1)$.

Based on Eq. (4), the angles $\alpha_1$ and $\phi_1$ for the point $(x_1, y_1, z_1)$ may be found using the following relationships:

$$\cos(2\alpha_1) = x_1$$

$$\sin(2\alpha_1)\cos(\phi_1) = y_1$$

$$\sin(2\alpha_1)\sin(\phi_1) = z_1 \quad (11)$$

Thus, $$\phi_1 = \arctan(z_1/y_1)$$

$$\alpha_1 = \arctan(\sqrt{y_1^2 + z_1^2}/x_1)/2 \quad (12)$$

If the polarization multiplexed optical wave 108 received by the polarization diversity receiver 500 is described by the Jones vector:

$$E_o = \begin{pmatrix} z_x \\ z_y \end{pmatrix} \quad (13)$$

where $z_x$ and $z_y$ are the complex numbers described in Eq. (10), and a birefringence matrix (B) and a rotation matrix (R) are defined as:

$$B = \begin{pmatrix} \exp\left(-\frac{j\varphi_1}{2}\right) & 0 \\ 0 & \exp\left(\frac{j\varphi_1}{2}\right) \end{pmatrix} \quad (14)$$

$$R = \begin{pmatrix} \cos(\alpha_1) & \sin(\alpha_1) \\ \sin(-\alpha_1) & \cos(\alpha_1) \end{pmatrix},$$

then the first and second transmitted optical waves 110, 112 may be recovered from the first and second received optical waves 118, 120 by multiplying the Jones vector ($E_0$) by the birefringence and rotation matrices, as follows:

$$E_i = R \cdot B \cdot E_o. \quad (15)$$

The defined transformation converts the Stokes vector $(x_1, y_1, z_1)$ and the corresponding Jones vector $$\begin{pmatrix} \cos(\alpha_1) \\ \sin(\alpha_1)\exp(\varphi_1) \end{pmatrix}$$

into the Jones vector $$\begin{pmatrix} 1 \\ 0 \end{pmatrix}.$$

Thus, it operates to align the polarization states of the first and second transmitted optical waves 110, 112 with horizontal and vertical polarization states described by the Jones vectors $$\begin{pmatrix} 1 \\ 0 \end{pmatrix} \text{ and } \begin{pmatrix} 0 \\ 1 \end{pmatrix}.$$

Figure 7:
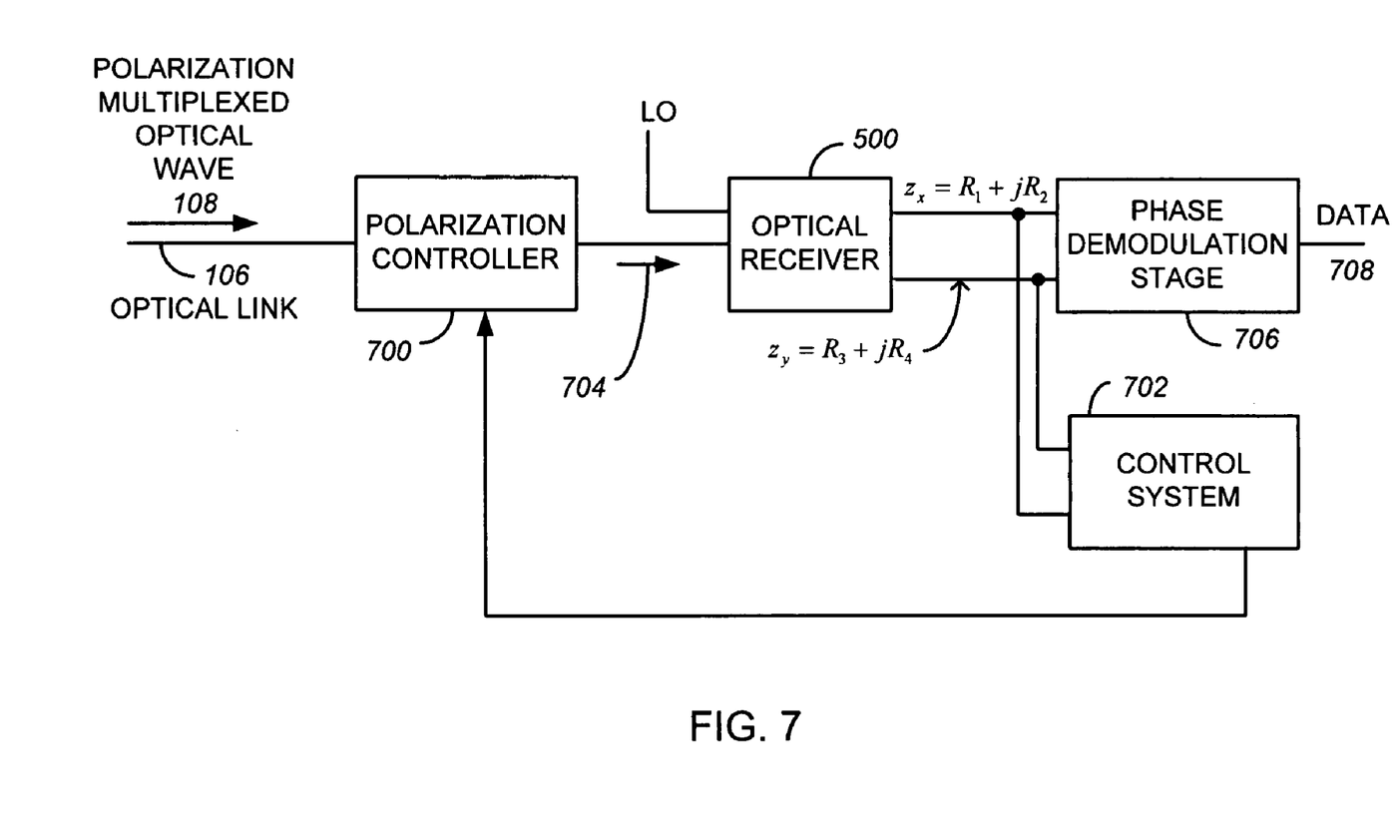
FIG. 7 illustrates a first exemplary embodiment of the polarization multiplexed optical transmission system shown in FIG. 1, for implementing the method shown in FIG. 4.

A transform such as the one defined by Eq. (15), or an equivalent transform, may be used in various ways to recover the first and second transmitted optical waves 110, 112 from the polarization multiplexed optical wave 108. In some embodiments, the transform that is equivalent to that of Eq. (15) may be applied to the polarization multiplexed optical wave 108 by, for example, configuring a polarization controller 700 placed upstream from the receiver 500, as shown in FIG. 7. The exact settings of the polarization controller 700 depend on its construction. For example, the polarization controller 700 may contain a half-waveplate and a quarter-waveplate, the positions of which are selected to accomplish the polarization state transformation described in Eq. (15). As shown in FIG. 7, a control system 702 receives the complex signals $z_x = R_1 + jR_2$ and $z_y = R_3 + jR_4$ generated by the receiver 500. For n samples of the complex signals $z_x = R_1 + jR_2$ and $z_y = R_3 + jR_4$, the control system 702 determines the polarization state of the polarization multiplexed optical wave 704. From the determined polarization states, the control system 702 then estimates a transform such as the one defined by Eq. (15), or an equivalent transform, and provides appropriate control signals to the polarization controller 700, such that the transform is applied to the polarization multiplexed optical wave 108. In this manner, the polarization state of the polarization multiplexed optical wave 108 can be altered such that the receiver 500 is caused to separate the first and second transmitted optical waves 110, 112 from the polarization multiplexed optical wave 704 (i.e., the receiver is aligned with the first and second transmitted optical waves 110, 112 described by Eq. (1)). A phase demodulation stage 706 then receives the complex signals $z_x \propto a_h \exp(j\phi_h + j\phi_{LO})$ and $z_y \propto a_v \exp(j\phi_v + j\phi_{LO})$ and demodulates these electrical representations of the first and second transmitted optical waves 110, 112 to extract the data 708 that is encoded in the first and second transmitted optical waves 110, 112. Techniques for demodulating complex signals are known to those skilled in the field of optical communications.

Figure 8:
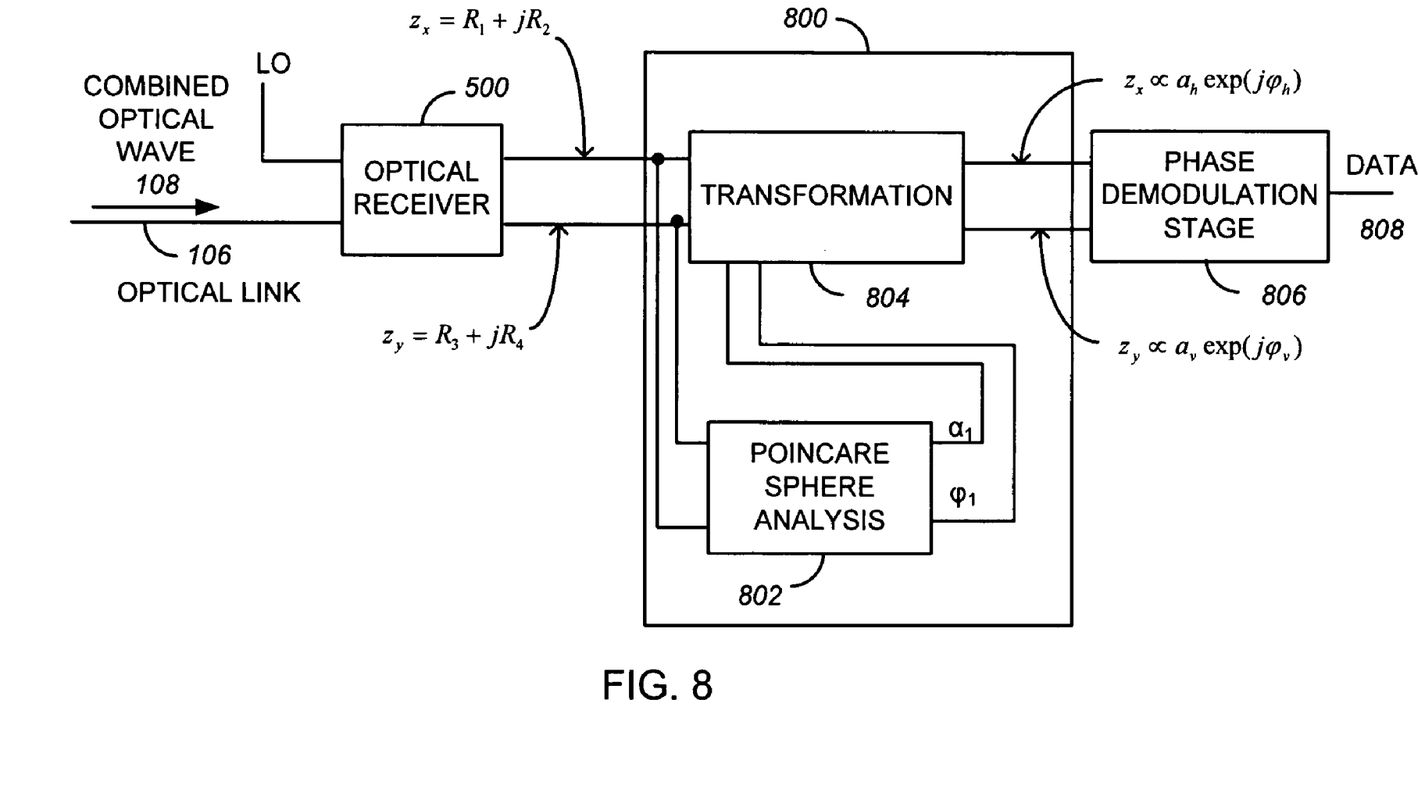
FIG. 8 illustrates a second exemplary embodiment of the polarization multiplexed optical transmission system shown in FIG. 1, for implementing the method shown in FIG. 4.

FIG. 8 illustrates another way to recover the first and second transmitted optical waves 110, 112 from the polarization multiplexed optical wave 108. In FIG. 8, the polarization controller 700 is dispensed with, and the polarization multiplexed optical wave 108 is received directly into the receiver 500. As shown, a control system 800 receives the complex signals $z_x = R_1 + jR_2$ and $z_y = R_3 + jR_4$ generated by the receiver 500. For n samples of the complex signals $z_x = R_1 + jR_2$ and $z_y = R_3 + jR_4$, the control system 800 determines the polarization state of the polarization multiplexed optical wave 108. From the determined polarization states, the control system 800 then estimates a transform such as the one defined by Eq. (15) (or an equivalent transform). The transform is then applied to the complex signals $z_x = R_1 + jR_2$ and $z_y = R_3 + jR_4$ by means of Eq. (15), where $$E_0 = \begin{pmatrix} z_x \\ z_y \end{pmatrix},$$

to yield the complex signals $z'_x \propto a_h \exp(j\phi_h + j\phi_{LO})$ and $z'_y \propto a_v \exp(j\phi_v + j\phi_{LO})$, thereby transforming the measured complex signals into the complex signals that represent the first and second transmitted optical waves 110, 112.

In FIG. 8, the control system 800 is arbitrarily divided into a portion 802 labeled "Poincaré Sphere Analysis" and a portion 804 labeled "Transformation". The portion 802 labeled "Poincaré Sphere Analysis" determines the polarization states of the polarization multiplexed optical wave 108 and outputs the angles $\alpha_1$ and $\phi_1$ defined by Eq. (14). The portion 804 labeled "Transformation" then estimates and applies a transform, based on the angles $\alpha_1$ and $\phi_1$, to the complex signals $z_x = R_1 + jR_2$ and $z_y = R_3 + jR_4$ by means of Eq. (15), where $$E_0 = \begin{pmatrix} z_x \\ z_y \end{pmatrix},$$

to yield the complex signals $z'_x \propto a_h \exp(j\phi_h + j\phi_{LO})$ and $z'_y \propto a_v \exp(j\phi_v + j\phi_{LO})$ that define the first and second transmitted optical waves 110, 112.

A phase demodulation stage 806 then receives the complex signals $z_x \propto a_h \exp(j\phi_h + j\phi_{LO})$ and $z_y \propto a_v \exp(j\phi_v + j\phi_{LO})$ and demodulates these electrical representations of the first and second transmitted optical waves 110, 112 to extract the data 808 that is encoded in the first and second transmitted optical waves 110, 112. Techniques for demodulating complex signals are known to those skilled in the field of optical communications.

In some embodiments, part or all of the control systems 702, 800 shown in FIGS. 7 & 8 may be implemented using hardware, firmware or software. Hardware implementations may variously comprise a programmed circuit such as a field-programmable gate array (FPGA) or microprocessor. Firmware and software implementations may comprise machine-readable instructions stored on one or more tangible computer-readable media (e.g., a random access memory (RAM), read-only memory (ROM), or a fixed or removable magnetic or optical disk). When read and executed by a processor, the machine-readable instructions cause the processor to implement some or all of the functions of the control system 702 or 800.

The methods and apparatus disclosed herein are useful, in one respect, in that they eliminate the need to iterative search for a transform that aligns the orthogonal polarization states of the first and second optical waves with respect to principal axes of a receiver. Instead, the transform is estimated from measured polarization states of a polarization multiplexed optical wave. Because the iterative searching is eliminated, and because the transform is based on measurements of actual polarization states, the methods and apparatus disclosed herein are capable of estimating a transform more reliably, more quickly, and more precisely than iterative search algorithms.

Although exemplary embodiments of the methods and apparatus disclosed herein have been described with respect to an n-ary phase shift keying of first and second transmitted optical waves 110, 112, the methods and apparatus disclosed herein are operable to recover any pair of optical waves having orthogonal linear polarization states, so long as at least one of the optical waves has a modulated phase. With more complex modulation schemes, involving modulation of phase and amplitude, multiple planes or three-dimensional objects can be formed within the three-dimensional Stokes space. However, if the orientation of these three-dimensional objects can be uniquely determined in a three-dimensional space, the disclosed methods and apparatus are still applicable. In addition, the methods and apparatus disclosed herein can be adapted for the recovery of only a single optical wave having an arbitrary phase or amplitude modulation, as described in the following paragraphs.

In certain cases, it is possible that the first or second transmitted optical wave 110, 112 (FIG. 1) is a zero-amplitude optical wave. In these cases, the PBC 114 effectively transmits a single optical wave over the optical link 106. The single optical wave propagates through the optical link 106 in a single polarization state that evolves along the link 106 and with time. Thus, upon arrival at the optical receiver 104, the polarization state of the single optical wave is likely to be misaligned with the principal axes of the receiver 104 (as defined by the PBS 116). However, using the disclosed method it is possible to align the polarization state of the single optical wave with respect to an axis of the optical receiver 104. That is, the optical receiver 104 (or 500, FIG. 5) can still measure the electrical field of a received optical wave, even though the received optical wave is no longer really a polarization multiplexed optical wave. The control system 702 or 800 (FIG. 7 or 8) can also determine a plurality of polarization states of the received optical wave. However, instead of the measured polarization states being distributed in clusters about a circle (or great circle 300), as shown in FIG. 6, the measured polarization states will belong to a single cluster, such as the cluster surrounding the point $Q_1$. In such a case, there is no need to fit a plane to the polarization states. Nor is there a need to determine a normal to any plane. This is because the measured polarization states directly correspond to the polarization state of the single optical wave that was transmitted by the optical transmitter 102 (subject, that is, to polarization dependent loss). Instead of fitting a plane and determining a normal, the measured polarization states of a single cluster may be defined by a vector $(q_1, q_2, q_3)$ representing, for example, the average, mean or center of mass of the cluster. Alternately, it is possible to measure only a single polarization state, although this may fail to provide sufficient precision.

For sake of this explanation, it is considered that the average of the polarization states distributed about point $Q_1$ is simply the point $Q_1$. Having identified the polarization state of point $Q_1$, a transform that aligns this polarization state with a principal axis of the optical receiver 104 (or 500) can be estimated, and the single optical wave transmitted by the optical transmitter 102 can be recovered. Thus, using the apparatus shown in FIG. 7 or 8, a zero-amplitude optical wave will also be recovered. However, power measurements for the two recovered waves (one being absent) can be used to determine which of the recovered waves is meaningful.

Given the description provided in the above paragraph, it should be clear that the method shown in FIG. 4 can also be adapted for use outside of a polarization multiplexed optical system 100 (FIG. 1). That is, even in a system that does not employ polarization multiplexing, the electrical field of a received optical wave may be measured; a plurality of polarization states of the received optical wave may be measured; a transform may be estimated; and the transform may be used to recover the optical wave that was actually transmitted.

What is claimed is:

1. A method of recovering first and second transmitted optical waves from a polarization multiplexed optical wave, the first and second transmitted optical waves having orthogonal polarization states, the method comprising:
   at an optical receiver, measuring an electrical field of the polarization multiplexed optical wave;
   determining, from the measured electrical field, a plurality of polarization states of the polarization multiplexed optical wave;
   estimating, from the plurality of polarization states, a transform that aligns the orthogonal polarization states of the first and second transmitted optical waves with respect to principal axes of the optical receiver; and
   recovering the first and second transmitted optical waves by applying the transform to one of i) the polarization multiplexed optical wave and ii) the measured electrical field of the polarization multiplexed optical wave.

2. The method of claim 1, wherein the transform is applied to the polarization multiplexed optical wave by altering the polarization state of the polarization multiplexed optical wave.

3. The method of claim 1, wherein:
   measuring the electrical field of the polarization multiplexed optical wave comprises determining a Jones vector that describes the polarization multiplexed optical wave; and
   the transform is applied to the measured electrical field of the polarization multiplexed optical wave by applying the transform to the Jones vector.

4. The method of claim 3, wherein estimating the transform comprises estimating a birefringence matrix and a rotation matrix.

5. The method of claim 1, further comprising:
   splitting first and second received optical waves from the polarization multiplexed optical wave, the first and second received optical waves having orthogonal polarization states, wherein:
   measuring the electrical field of the polarization multiplexed optical wave comprises determining a Jones vector that contains the electrical fields of the first and second received optical waves; and
   the transform is applied to the measured electrical field of the polarization multiplexed optical wave by applying the transform to the Jones vector.

6. The method of claim 1, wherein estimating the transform comprises:
   fitting a plane in Stokes' space to the plurality of polarization states; and
   identifying a normal to the plane, the normal containing the center of the Poincaré sphere; and
   determining a transform that aligns the normal with respect to the principal axes of the optical receiver.

7. A method of recovering a transmitted optical wave, the method comprising:
   at an optical receiver, measuring an electrical field of a received optical wave;
   determining, from the measured electrical field, at least one polarization state of the received optical wave;
   estimating, from the at least one polarization state of the received optical wave, a transform that aligns a polarization state of the transmitted optical wave with respect to a principal axis of the optical receiver; and
   recovering the transmitted optical wave by applying the transform to one of i) the received optical wave and ii) the measured electrical field of the received optical wave.

8. The method of claim 7, wherein the transform is applied to the received optical wave by altering the polarization state of the received optical wave.

9. The method of claim 7, wherein:
   measuring the electrical field of the received optical wave comprises determining a Jones vector that describes the received optical wave; and
   the transform is applied to the measured electrical field of the received optical wave by applying the transform to the Jones vector.

10. The method of claim 9, wherein estimating the transform comprises estimating a birefringence matrix and a rotation matrix.

11. The method of claim 7, further comprising:
    splitting the received optical wave into first and second received optical waves, the first and second received optical waves having orthogonal polarization states, wherein:
    measuring the electrical field of the received optical wave comprises determining a Jones vector that contains the electrical fields of the first and second received optical waves; and
    the transform is applied to the measured electrical field of the received optical wave by applying the transform to the Jones vector.

12. Apparatus for recovering first and second transmitted optical waves from a polarization multiplexed optical wave, the first and second transmitted optical waves having orthogonal polarization states, the apparatus comprising:
    an optical receiver configured to receive the polarization multiplexed optical wave and measure an electrical field of the polarization multiplexed optical wave; and
    a control system configured to i) determine, from the measured electrical field, a plurality of polarization states of the polarization multiplexed optical wave, ii) estimate, from the plurality of polarization states, a transform that aligns the orthogonal polarization states of the first and second transmitted optical waves with respect to principle axes of the optical receiver, and iii) apply the transform to one of A) the polarization multiplexed optical wave and B) the measured electrical field of the polarization multiplexed optical wave.

13. The apparatus of claim 12, wherein the receiver comprises a polarization diverse heterodyne receiver using a pair of 90° optical hybrids.

14. The apparatus of claim 12, further comprising a polarization controller, the polarization controller configured to receive and alter the polarization state of the polarization multiplexed optical wave; wherein the control system is configured to apply the transform to the polarization multiplexed optical wave by configuring the polarization controller to apply the transform to the polarization multiplexed optical wave.

15. The apparatus of claim 12, wherein the control system determines a polarization state of the polarization multiplexed optical wave by determining Stokes' parameters for the polarization state of the polarization multiplexed optical wave.

16. The apparatus of claim 15, wherein the control system estimates the transform by:
   fitting a plane in Stokes' space to the plurality of polarization states; and
   identifying a normal to the plane, the normal containing the center of the Poincaré sphere; and
   determining a transform that aligns the normal with respect to the principal axes of the optical receiver.

17. A heterodyne polarimeter, comprising:
   a polarization beam splitter configured to split an input optical wave into first and second optical waves having orthogonal polarization states;
   a pair of 90° optical hybrids, each 90° optical hybrid having a local oscillator input and an optical input configured to receive a respective one of the first and second optical waves, and each 90° optical hybrid having at least two optical outputs;
   a set of detectors, each of the detectors configured to receive at least two optical waves from the optical outputs of the pair of 90° optical hybrids, and each of the detectors configured to produce electrical in-phase and quadrature signals for reconstructing an electrical field of the first and second optical waves, the electrical field being offset by an unknown phase of the local oscillator; and
   a processing system configured to determine a polarization state of the input optical wave, the polarization state being independent of the phase of the local oscillator.

* * * * *